Aug. 30, 1927.
J. W. BETTENDORF
BRAKE HANGER
Filed July 26, 1926
1,640,590
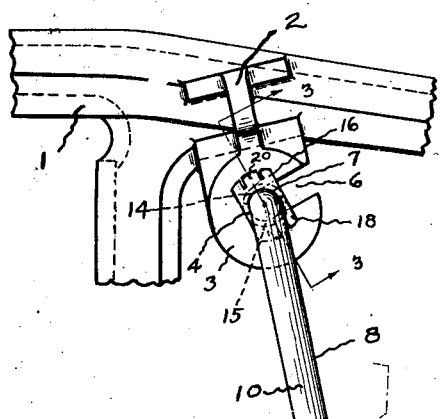
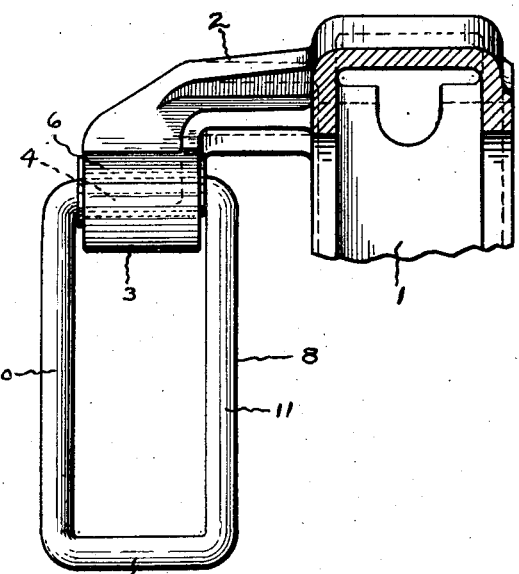
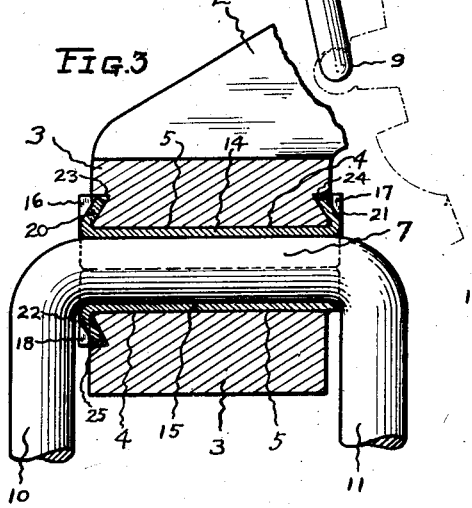
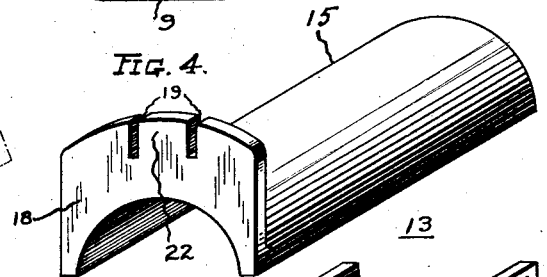
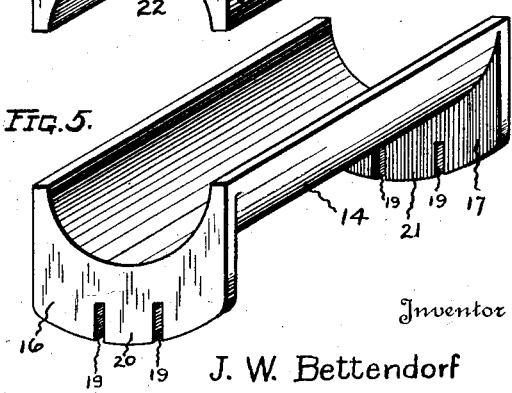
Inventor
J. W. Bettendorf
By Evans and McCoy
Attorneys Patented Aug. 30, 1927.

1,640,590

UNITED STATES PATENT OFFICE.

JOSEPH W. BETTENDORF, OF BETTENDORF, IOWA.

BRAKE HANGER.

Application filed July 26, 1926. Serial No. 124,803.

This invention relates to railway brake hanger mechanism and more particularly to a bearing portion for supporting said brake hanger, and to readily replaceable means for reducing the wear on said bearing portion.

In railway brake hanger construction, it is desirable that the hanger and its supporting means be constructed to provide long usage. Furthermore, the hanger and the bracket connection must be secure to prevent the brake construction from dropping and thereby causing possible derailment and consequent wreckage. From an economic standpoint, it is desirable that replaceable means be provided to reduce the wear on the brake hanger supporting means, which means should preferably be replaceable without requiring disassembly of the railway car truck.

An object of this invention is to provide a brake hanger supporting means construction adapted to provide long life of the supporting means and of the brake hanger.

Another object of my invention is to provide a large bearing surface between the brake hanger and the brake hanger supporting means, whereby to uniformly distribute pressure and wear.

A further object of the invention is to provide a bushing between the brake hanger and the bearing portion of a brake hanger supporting means, said bushing being rotatively locked with respect to said bearing portion to prevent wear thereof.

Another object of the invention is to provide a sectional bushing adapted to be disposed between a brake hanger end and a slotted bearing portion and to substantially surround said brake hanger end, which bushing may be readily disposed in position and replaced without disassembly of the railway car truck.

These and other objects of my invention will be apparent to those skilled in the art from the following description and annexed drawings in which:

Figure 1 is a fragmentary side elevation showing a portion of a truck side frame, a supporting bracket integrally formed therewith, a brake hanger supported in the bearing portion of said bracket, and a bushing according to my invention disposed between said brake hanger and bearing portion;

Fig. 2 is a fragmentary front elevation, partly in section, of the cooperating parts shown in Fig. 1;

Fig. 3 is a sectional view on line 3—3 of Fig. 1;

Fig. 4 is a perspective view of one section of an improved bushing according to my invention; and Fig. 5 is a perspective view of a bushing section adapted to form, with the section shown in Fig. 4, a complete bushing according to my invention.

In the drawings, is shown a railway car truck side frame 1 to which is attached a brake hanger supporting means comprising a bracket 2 at the outer end of which is provided a bearing portion 3 having a bearing aperture 4 with aperture walls 5 extending longitudinally thereof. The bracket 2 is preferably formed integral with the side frame 1. The bearing aperture 4 is preferably cylindrically shaped and communicates with the exterior of said bearing portion by means of the slot 6 extending longitudinally of the bearing aperture 4 and outwardly thereof.

Referring particularly to Fig. 1, the slot 6 is shown extending outwardly in such direction that a solid bearing surface is presented to the brake hanger end 7 in each direction of thrust longitudinal of the brake hanger.

Within the bearing aperture 4 is shown the upper end 7 of the brake hanger 8. The hanger 8 may be of the closed rectangular loop type having upper and lower ends 7 and 9, and sides 10 and 11, and the hanger may be formed of any suitable material, such as rolled or cast steel. The lower end 9 is adapted to cooperate with the brake head 12 suggested in the dotted lines in Fig. 1, which brake head 12 is in turn adapted to cooperate with a brake shoe (not shown) as will be readily understood by those skilled in the art. The brake hanger ends 7 and 9 may be of any desired diameter or width, the slot 6 being preferably of such size to accommodate the end 7.

During the operation of the brakes, the brake hanger 8 is given a limited pivotal motion about the brake hanger end 7, which pivotal motion, in the absence of a bushing, would in time cause considerable wear of the bearing portion 3. Where the bracket 2 and bearing portion 3 are formed integral with the side frame 1, it is particularly desirable that the bearing portion 3 remain in serviceable condition as long as the side frame 1.

I have, therefore, provided a bushing 13 adapted to be disposed intermediate the brake hanger end 7 and the bearing portion 3 and to be locked against rotation with respect to said bearing portion. My improved bushing 13 is adapted to be disposed within the bearing aperture 4 and to be removed therefrom without requiring disassembly of the car truck, thereby, in certain cases, effecting great economic savings. The bushing 13 is preferably cylindrical in shape and longitudinally split to provide a plurality of bushing sections. The bushing may be made of any suitable material, such as steel.

The bushing shown in the drawings is shown as comprising a pair of substantially semi-cylindrical bushing sections 14 and 15. The said bushing sections are shown as provided at their ends with the lateral extensions 16, 17 and 18, respectively. The said extensions may be slotted at 19 to provide the bendable portions 20, 21 and 22 adapted to engage in the detents 23, 24 and 25 in the bearing portion 3 to thereby lock the bushing 13 against rotative movement within the bearing aperture. The bendable portions 23 and 24 also serve to prevent the bushing section 14 from appreciable longitudinal movement within the aperture 4.

The bushing 13 and the brake hanger end 7 may be readily disposed in bearing aperture 4 without disassembly of the car truck. Thus the bushing section 14 may be disposed in the bearing aperture 4 as by moving said section through the slot 6, the said section then being preferably disposed to leave the slot substantially open. The brake hanger end 7 may then be disposed in substantial parallel alignment with the slot 6 and moved therethrough into the bearing aperture 4.

The bushing section 15 may then be inserted longitudinally into the bearing aperture 4 from one end thereof. The bushing sections 14 and 15 are then preferably rotated to the position shown in Fig. 3 and the bendable portions 20, 21 and 22 bent into the corresponding detents 23, 24 and 25. Referring to Fig. 3 it will be noted that the brake hanger sides 10 and 11 serve to prevent the bushing section 15 from being dislodged from the bearing aperture 4 and from appreciable longitudinal movement therein.

It will be understood, of course, that various structural modifications of the bushing sections shown may be made within the scope of my invention, one or both of such bushing sections being arranged to be disposed within a bearing aperture intermediate a brake hanger end and a bearing portion when said brake hanger end is disposed in said aperture.

The reverse procedure to that outlined in the second previous paragraph, may be employed to remove the bushing 13 from the bearing aperture 4, whereby a worn bushing may be readily replaced without requiring disassembly of the car truck.

It will thus be seen that I have provided a very advantageous combination of parts whereby wear of the brake hanger supporting portion may be substantially eliminated.

It will also be noted that I have provided a new and novel sectional bushing adapted to be disposed between a brake hanger end and a brake hanger supporting portion.

It will furthermore be seen that I have provided a method of disposing a sectional bushing in, and removing such bushing from, a brake hanger support bearing portion without necessitating disassembly of the car truck of which said bearing portion forms a part.

It is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In brake mechanism, in combination, a brake hanger support having a bearing portion provided with a bearing aperture, said bearing portion being provided with a slot extending outwardly of said bearing portion from said aperture, a brake hanger end disposed in said aperture, a longitudinally split cylindrical bushing comprising a plurality of bushing sections disposed in said aperture between said brake hanger end and said bearing portion and substantially surrounding said brake hanger end, and means to prevent appreciable rotative and longitudinal movement of said bushing in said aperture.

2. In brake mechanism, in combination, a brake hanger support having a bearing portion provided with a cylindrical bearing aperture, said bearing portions being provided with a slot extending outwardly of said bearing portion from said aperture, a brake hanger end disposed in said aperture, a longitudinally split cylindrical bushing comprising a plurality of bushing sections disposed intermediate said brake hanger end and said bearing portion and substantially surrounding said brake hanger end, and means carried by said bushing to prevent rotative movement of said bushing in said aperture.

3. In brake mechanism, in combination, a brake hanger support having a bearing portion provided with a substantially cylindrical bearing aperture, said bearing portion being provided with a slot extending outwardly of said bearing portion from said aperture, a brake hanger having an end, and sides attached to said end, said brake hanger end being disposed in said aperture, a longitudinally split cylindrical bushing, comprising a plurality of bushing sections disposed intermediate said brake hanger end and said bearing portion and substantially surrounding said brake hanger end, and means including said brake hanger sides to prevent appreciable longitudinal movement of said bushing in said aperture.

4. In brake mechanism, in combination, a brake hanger support having a bearing portion provided with a cylindrical bearing aperture, said bearing portion being provided with a slot extending outwardly of said bearing portion from said aperture, said slot being at least as wide as a brake hanger end to be disposed in said aperture, a brake hanger having an end and sides attached thereto, said end portion being disposed in said aperture, a longitudinally split cylindrical bushing disposed in said bearing aperture between said brake hanger end and said bearing portion and substantially surrounding said brake hanger end, lateral extensions carried by said bushing adjacent the ends thereof formed to cooperate with said bearing portion, said extensions and said brake hanger sides being adapted to prevent substantial longitudinal and rotative movement of said bushing in said aperture.

5. In brake mechanism, in combination, a brake hanger support having a bearing portion provided with a slotted bearing aperture, a brake hanger having an end adapted to be received in said aperture, a bushing disposed intermediate said brake hanger end and said bearing portion, and substantially surrounding said end, said bushing comprising a pair of bushing sections, one of said sections being adapted to be moved longitudinally into said bearing aperture when said end portion and the other of said bushing sections are already disposed within said bearing aperture, and means to prevent appreciable longitudinal and rotative movement of said bushing sections within said aperture.

6. A longitudinally split cylindrical bushing for use in railway car truck brake mechanism and adapted to be applied to and removed from a bearing portion without disassembly of said car truck, said bushing comprising a pair of sections, said bushing having lateral extensions arranged to cooperate with a bearing portion to prevent substantial movement of said bushing in said bearing portion.

7. In railway car truck brake mechanism, a bushing for use in a slotted bearing aperture intermediate a brake hanger end and a bearing portion and substantially surrounding said brake hanger end, said bushing being adapted to be disposed in position and removed without disassembly of said car truck, said bushing comprising a plurality of sections, one of said sections being adapted to be moved longitudinally into said bearing aperture when said brake hanger end and the remainder of said bushing are disposed within said aperture, and means carried by said bushing to cooperate with said bearing portion to prevent rotative movement of said bushing within said bearing aperture.

8. A substantially cylindrical longitudinally split bushing for use in railway car truck brake mechanism, and adapted to be disposed in and removed from a slotted bearing aperture intermediate a brake hanger end and a bearing portion without disassembly of said car truck, said bushing comprising a pair of bushing sections, one of said sections being provided with lateral extensions at each end thereof to cooperate with said bearing portion to prevent longitudinal and rotative movement of said section, said other section being adapted to be moved longitudinally into said aperture, when said brake hanger end and said first bushing section are already disposed within said aperture.

9. A substantially cylindrical bushing for use in railway car truck brake mechanism and adapted to be disposed in a slotted bearing aperture of a bearing portion intermediate a brake hanger end, and said bearing portion without disassembly of said car truck, said bushing comprising a pair of longitudinal sections, extensions extending laterally at each end of one of said sections, said extensions being adapted to cooperate with the outer sides of said bearing portion, to prevent rotative movement of said bushing and longitudinal movement of said section, and an extension disposed at one end of said other bushing section adapted to cooperate with said bearing portion.

10. A bushing for use in railway car truck mechanism with a brake hanger and brake hanger bearing portion, said bushing comprising a pair of semi-cylindrical sections, a lateral extension on one end of one of said sections adapted to engage an outer side of said bearing portion, and a lateral extension on each end of said other bushing section adapted to extend along the outer sides of said bearing portion and to be bent into engagement therewith to prevent longitudinal and rotative movement of said section within said bearing portion.

In testimony whereof I affix my signature.

JOSEPH W. BETTENDORF.